US009759179B2

(12) United States Patent
Culpepper

(10) Patent No.: US 9,759,179 B2
(45) Date of Patent: Sep. 12, 2017

(54) HYDROELECTRIC GENERATOR SYSTEM INCLUDING HELICAL LONGITUDINAL BLADES FORMING AN OPEN BORE AND ALIGNED WITH A CURRENT DIRECTION

(71) Applicant: Charles B. Culpepper, Hot Springs, AR (US)

(72) Inventor: Charles B. Culpepper, Hot Springs, AR (US)

(*) Notice: Subject to any disclaimer, the term of this patent is extended or adjusted under 35 U.S.C. 154(b) by 0 days.

(21) Appl. No.: 14/859,077

(22) Filed: Sep. 18, 2015

(65) Prior Publication Data

US 2017/0145981 A1    May 25, 2017

(51) Int. Cl.
| F03B 3/04 | (2006.01) |
| F03B 3/12 | (2006.01) |
| H02K 7/18 | (2006.01) |
| F03B 3/18 | (2006.01) |
| F03B 11/00 | (2006.01) |
| F03B 13/10 | (2006.01) |

(52) U.S. Cl.
CPC ............... F03B 3/126 (2013.01); F03B 3/18 (2013.01); F03B 11/004 (2013.01); F03B 13/10 (2013.01); H02K 7/1823 (2013.01)

(58) Field of Classification Search
CPC .. F03B 3/18; F03B 3/126; F03B 13/10; F03B 11/004; H02K 7/1823
See application file for complete search history.

(56) References Cited

U.S. PATENT DOCUMENTS

| 1,816,971 | A | * | 8/1931 | Hoff | F03B 17/061 415/3.1 |
| 3,198,423 | A | * | 8/1965 | Clute | F04D 19/022 415/148 |
| 4,021,135 | A | * | 5/1977 | Pedersen | F03D 1/04 290/55 |
| 4,086,498 | A | * | 4/1978 | Szoeke | F03D 1/04 290/55 |
| 4,143,999 | A | * | 3/1979 | Ryall | F03B 3/04 415/72 |
| 4,163,904 | A | * | 8/1979 | Skendrovic | F03B 13/10 277/369 |
| 4,172,689 | A |   | 10/1979 | Thorsheim | |
| 4,219,303 | A | * | 8/1980 | Mouton, Jr. | F03B 17/061 415/123 |
| 4,258,271 | A | * | 3/1981 | Chappell | F03B 13/10 290/54 |
| 4,272,685 | A | * | 6/1981 | Toyama | F03B 13/06 290/52 |
| 4,274,009 | A | * | 6/1981 | Parker, Sr. | F03B 17/061 290/43 |
| 4,320,304 | A | * | 3/1982 | Karlsson | F03D 1/04 290/44 |

(Continued)

Primary Examiner — Tulsidas C Patel
Assistant Examiner — S. Mikailoff
(74) Attorney, Agent, or Firm — Joe D. Calhoun

(57) ABSTRACT

The invention disclosed herein comprises a system focusing water current into a relatively smaller diameter lumen, imparting vortical movement to the current, and directing the water vortex through an even smaller diameter lumen en route to turbine blades having long curved blades rotatable along an axis parallel with the lumen. Rotation of the turbine blades turns gearing interfacing with the circumference of the turbine assembly, to rotate a drive shaft connected to a generator.

11 Claims, 13 Drawing Sheets

(56) References Cited

U.S. PATENT DOCUMENTS

| | | | | |
|---|---|---|---|---|
| 4,324,985 A * | 4/1982 | Oman | ................ | F03D 1/04 290/55 |
| 4,424,452 A * | 1/1984 | Francis | ................ | B60K 16/00 290/44 |
| 4,600,360 A * | 7/1986 | Quarterman | ................ | F03D 1/04 415/148 |
| 4,622,471 A | 11/1986 | Schroeder | | |
| 4,648,788 A * | 3/1987 | Jochum | ................ | B63H 1/16 415/124.1 |
| 4,816,697 A * | 3/1989 | Nalbandyan | ................ | F03B 3/04 290/43 |
| 5,501,574 A * | 3/1996 | Raible | ................ | A61M 1/101 415/143 |
| 6,036,443 A * | 3/2000 | Gorlov | ................ | F03B 3/00 415/53.1 |
| 6,223,532 B1 | 5/2001 | Brassea-Flores | | |
| 7,348,686 B2 * | 3/2008 | Fielder | ................ | F03B 17/061 290/43 |
| 7,425,772 B2 * | 9/2008 | Novo Vidal | ................ | F03B 13/083 290/52 |
| 7,768,145 B2 * | 8/2010 | Susman | ................ | F03B 13/264 290/43 |
| 8,115,329 B2 * | 2/2012 | Thompson | ................ | F01D 5/141 290/43 |
| 8,350,400 B2 * | 1/2013 | Rosefsky | ................ | F03B 13/00 290/52 |
| 8,546,969 B2 * | 10/2013 | Rosefsky | ................ | F03B 13/00 290/52 |
| 8,633,609 B2 * | 1/2014 | Cornelius | ................ | E02B 9/00 290/54 |
| 8,754,540 B2 * | 6/2014 | Ives | ................ | F03B 13/10 290/42 |
| 8,801,359 B2 | 8/2014 | Sherrer | | |
| 8,853,873 B2 * | 10/2014 | Urch | ................ | F03B 17/061 290/43 |
| 9,599,090 B2 * | 3/2017 | Dale | ................ | F03B 3/04 |
| 2001/0031210 A1 * | 10/2001 | Antaki | ................ | A61M 1/101 417/356 |
| 2006/0169322 A1 | 8/2006 | Torkelson | | |
| 2007/0241566 A1 * | 10/2007 | Kuehnle | ................ | F03B 17/061 290/53 |
| 2008/0088135 A1 * | 4/2008 | Novo Vidal | ................ | F03B 13/083 290/54 |
| 2010/0066089 A1 * | 3/2010 | Best | ................ | F03B 3/06 290/52 |
| 2010/0283248 A1 * | 11/2010 | Moffat | ................ | F03B 13/22 290/52 |
| 2011/0037265 A1 * | 2/2011 | Fielder | ................ | F01D 15/10 290/52 |
| 2014/0017065 A1 * | 1/2014 | Dale | ................ | F03B 3/04 415/68 |
| 2015/0111752 A1 * | 4/2015 | Guina | ................ | H02K 31/00 505/163 |
| 2016/0177911 A1 * | 6/2016 | Kouris | ................ | F03B 3/02 290/52 |

* cited by examiner

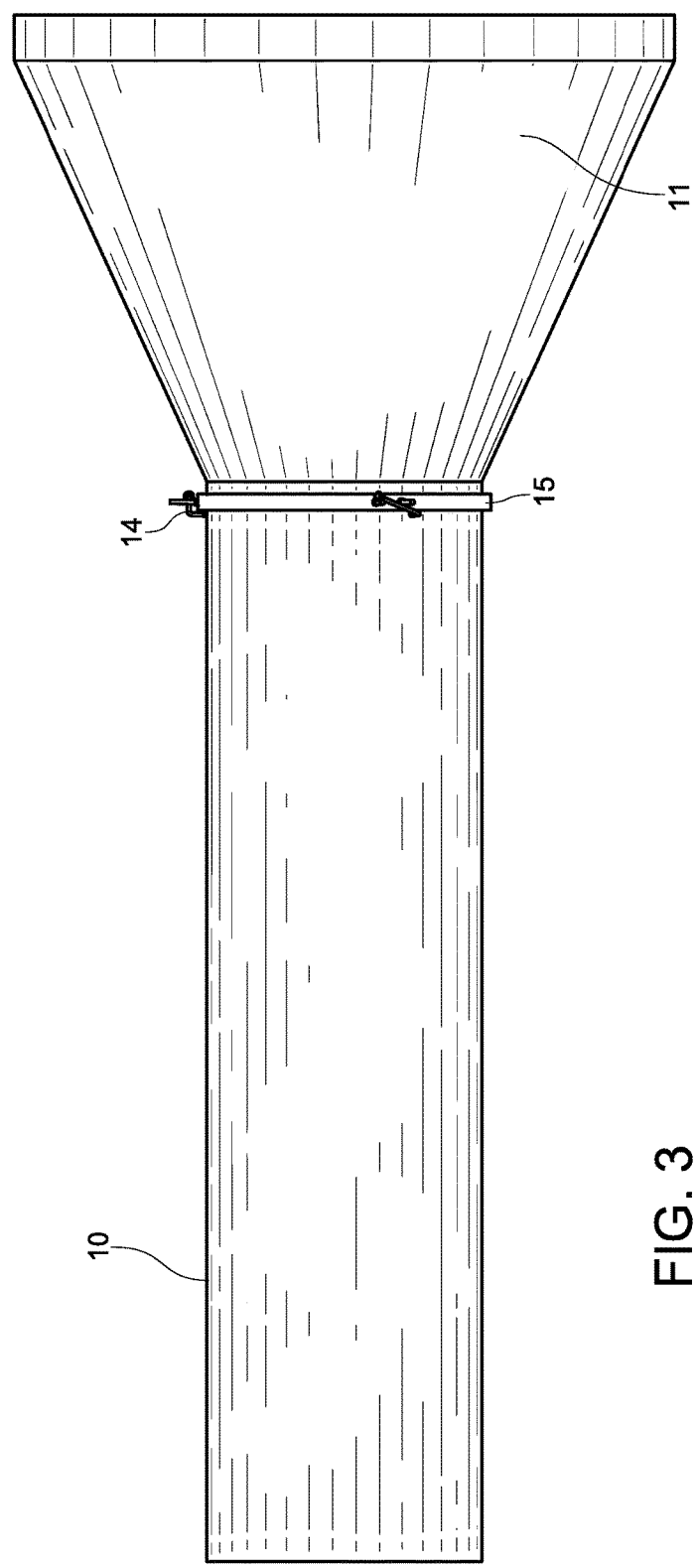

HYDROELECTRIC GENERATOR SYSTEM INCLUDING HELICAL LONGITUDINAL BLADES FORMING AN OPEN BORE AND ALIGNED WITH A CURRENT DIRECTION

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of the Invention

The present disclosure relates to the field of hydro-electric generator systems. This field includes systems for better utilizing water currents for producing electricity. More particularly, the invention disclosed herein relates to a hydro-electric generator system having an improved design for collecting and concentrating water current, for feeding to turbines having improved designs for harnessing the force of the water current and converting that force for producing electricity.

(2) Background of Invention

Water current is one source of abundant and consistent force that is not being fully utilized to generate electricity. Currents are found in waterways and bodies of water around the world. One example close to the United States is the Gulf Stream off the east coast. Other currents (flowing water) also present themselves in tidal basins and numerous fresh water systems. Additionally there is the outflow current from existing dam systems.

The apparatus that is described herein provides a means to utilize these forces, great or small. The apparatus described herein is scalable as well; it can be made in the size suitable to take full advantage of the force of the current it is deployed in. The environmental conditions can be the main determiner of the size of device needed for utilizing the force of a current.

The apparatus disclosed herein provides a means to use several of the properties of water. Water is a true "fluid", not compressible. Water is also approximately 8 times as dense as air; a two mile per hour current can approximate the force of a one hundred mile per hour wind.

Traditionally, paddle wheel arrangements have been prevalent, with the turbine blades having their longest edge and face perpendicular to the water flow; but when submerged, such turbine blades lose efficiency, because the travel circuit of the blades causes the blades to move upstream, against the current, almost half of the time. The structure supporting such turbines often impedes water flow as well. There are also designs of turbines using blades configured as propellers. However, the propeller blade designs are typically based upon aerodynamics, not hydro-dynamics. Such blades interact sparingly with the water force, and do not provide a means to take full advantage of the properties of water. Since both types of prior art are also typically in an open rather than closed (or confined) system, they also allow the water mass creating the force to escape without amplifying its force.

The following are arguably material to patentability of the invention disclosed herein.

| U.S. patent/application Ser. No. | 1st Named Inventor | Date of Patent/ Publication |
|---|---|---|
| 6,223,532 | Angel Brassea-Flores | May 1, 2001 |
| 8,801,359 | Gordon David Sherrer | Aug. 12, 2014 |
| 20060169322 | John E. Torkelson | Aug. 3, 2006 |
| 4,622,471 | Warren C. Schroeder | Nov. 11, 1986 |
| 4,172,689 | Ivar Thorsheim | Oct. 30, 1979 |

U.S. Pat. No. 8,801,359 issued to Sherrer discloses a system for extracting power from fluid (including river and ocean currents) using a bladeless disc turbine. This patent discloses a plurality of funnel-shaped fluid receiving inlets, collecting water current and increasing its velocity before delivery at "advantageous attack angles" to disc turbines spaced upon a common axle. (See FIGS. 1, 4 and 15.) This patent does not expressly disclose an upstream funnel defining a constricting conduit channeling water into a throat-valve including stationary pivot-gates enhancing the vortical movement of the water through a further constricting conduit feeding the water to the blades of a turbine rotating around a horizontal axle positioned parallel to the flow of water.

U.S. Pat. No. 4,172,689 issued to Thorsheim discloses a wave power generator having a plurality of side-by-side open funnels (with square or rectangular cross-sections) concentrating water flow en route to a shared manifold feeding the fast-moving fluid to a paddle-wheel turbine generator. (Best illustrated in FIGS. 4 and 5.)

U.S. Pat. No. 4,622,471 issued to Schroeder discloses an ocean wave hydro-electric generator facility for converting an entire ocean wave (at its peak kinetic force) to a continuous "river flow" penstock (conduit) and race (current) feeding the turbine. This patent discloses "upstream" horizontally-hinged intake gates adapted to permit the incoming waves to slide over the top of the downwardly pivoting gates and into the penstock, where it is fed in a continuous flow to a hydro-electric generator.

U.S. Pat. No. 6,223,532 issued to Brassea-Flores discloses hydro-electric turbines rotated by fluid in motion. One embodiment involves the injection of pressurized gas into a hollow axle carrying a funnel-shaped member having outlets for releasing the gas; when the turbine is submersed, the released gas causes the turbine to rotate on the axle to generate energy.

None of these references expressly discloses a hydro-electric generator system comprising an upstream funnel housing orientable in the same direction as water current and defining a constricting horizontal lumen, a throat including a throat-valve, and a turbine having a plurality of blades rotatable around an axis along the same direction as water current, the funnel initiating vortical movement of water into the throat-valve which, when in an open configuration, enhances the vortical movement of water to the blades for rotational force.

BRIEF SUMMARY OF THE INVENTION

In most general terms, the invention disclosed herein comprises a system focusing water current into a relatively smaller diameter lumen (tubular cavity), imparting vortical movement to the current, and directing the water vortex through an even smaller diameter lumen en route to turbine blades having long curved blades rotatable along an axis parallel with the lumen. Rotation of the turbine blades turns gearing interfacing with the circumference of the turbine assembly, to rotate a drive shaft connected to a generator. The invention disclosed herein is essentially a hydro-electric turbine system comprising an upstream funnel defining a constricting conduit channeling water into a throat-valve including stationary pivot-gates enhancing the vortical movement of the water through a further constricting conduit feeding the water to the blades of a turbine rotating around a horizontal axle positioned parallel to the flow of water.

The basic concept of the apparatus is a combination of technologies, but with a twist. The force of water is normally looked at to generate power (electricity), traditionally as by a hydro-electric dam system. This apparatus potentially utilizes the currents of all forms of bodies of water, both fresh and salt, to focus the current's power into the system to produce power. The potential of for generating electricity using water current force is immense. For example, off the eastern coast of the United States is the Gulf Stream, a current that continually flows. It has been estimated that it alone has the combined flow of all of the rivers of the world multiplied by seventy (70). It also has the added benefit of continuous flow, whereas a hydro-electric power dam often relies upon a reservoir that has to be restored periodically. The funnel and throat-valve disclosed herein provide a means to create rotation and increase water velocity, and focus the force of water into the turbine as a spiraling mass of water force impacting the turbine blades over a relatively substantial distance. Such force over distance provides a means to capture and convert the movement of water into usable energy, with less impedance by the structure.

The length of the turbine and the length of the blades of the invention disclosed herein are scalable, to provide as much interaction with the water force as is optimal for the generation of electricity. The disclosed apparatus utilizes a turbine designed to capture more of the force of the water current, with less loss from the structure of the apparatus.

The invention disclosed herein has advantages at various stages of the system.

STAGE ONE, the funnel opening: channels the water current into the system. By using Bernoulli's Principle of fluid dynamics, the funnel reduces the size of the bore of the tube. Since water is a "true" fluid it cannot be compressed. Therefore in order for the mass (water) to proceed into the system, its velocity must increase.

STAGE TWO, the valve or damper: This is where the twist occurs. By placing a valve or damper in a manner depicted, there is a vortex started. It typically produces a counter clockwise rotation. This vortex is important for the turbine phase.

STAGE THREE, the vortex chamber: continues to focus the force of the current direction, organizes the twisting vortex prior to entering the turbine phase. There is a further reduction in the diameter of the chamber by placing reducing rings that match the diameter of the chamber to the interior of the turbine circumference; this will again increase velocity of the current and further focus the force and vortex.

STAGE FOUR: the turbine: the design of the turbine takes advantage of the density of water (approximately 8 times the density of air) and also the interaction with the force of the water current over a distance. One embodiment also utilizes the circumference of the turbine rather than a central axis of axle, as the point of connection with the generator or an intermediate drive shaft. Another embodiment has an open bore, to allow any objects to pass through the system; this would include any life forms that may interact with the system.

BRIEF DESCRIPTION OF FIGURES OF THE DRAWINGS

FIG. 3 depicts a bottom plan view of the invention of FIG. 1.

FIG. 5B depicts a portion of an upstream end of a sleeve (51), radial struts (31), and a canister (41) together with an annular convergence collar (71).

FIG. 9B depicts a sleeve (51) defining a lumen (54) and having a cogged ring (52) and rail-riding wheels (53), together with an annular convergence collar (71); also depicted in FIG. 9B is an arrangement of blades forming an interior passageway (55) and each having a peripheral edge (22) for anchoring to the sleeve, an axial edge (21) and a vortically curved primary face (23). Also depicted are two halves of a rail ring (42a and 42b), removed from the canister and separated by broken lines.

DETAILED DESCRIPTION OF THE INVENTION

Figure 1:
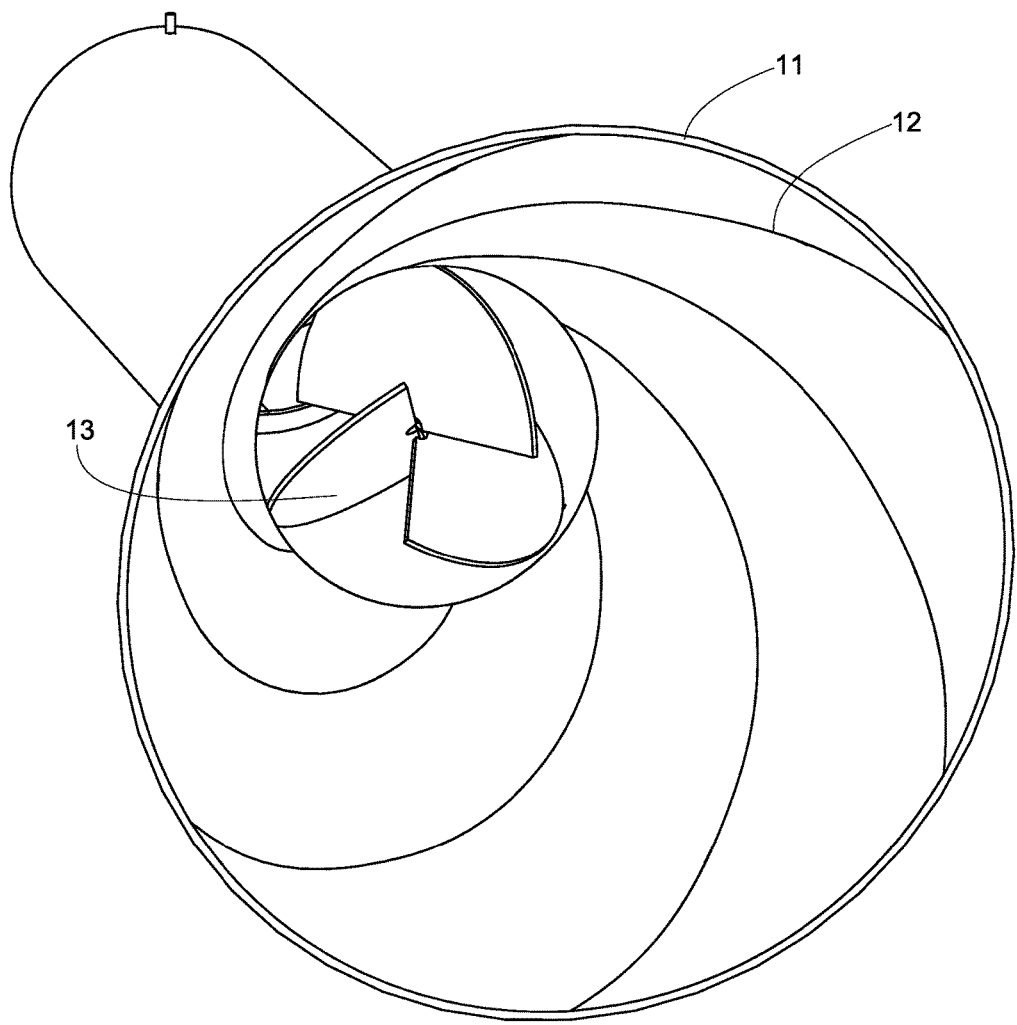
FIG. 1 depicts an upstream perspective view of a representative sample of one embodiment of the invention, with the throat valve pivot-plates (13) in a fully open configuration.
Figure 2A:
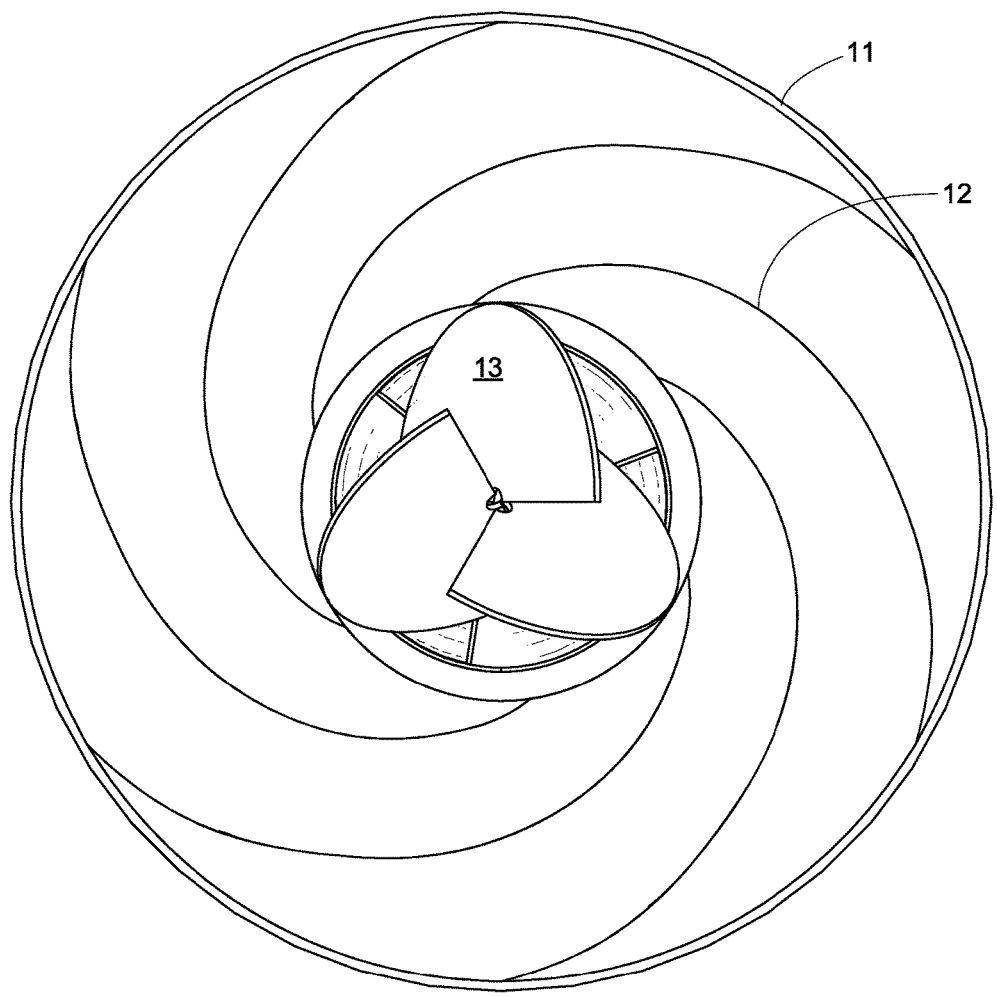
FIG. 2A depicts an elevation view of the upstream funnel end (or front end) of the invention of FIG. 1, with the pivot-plates of the throat-valve in an open configuration.
Figure 2B:
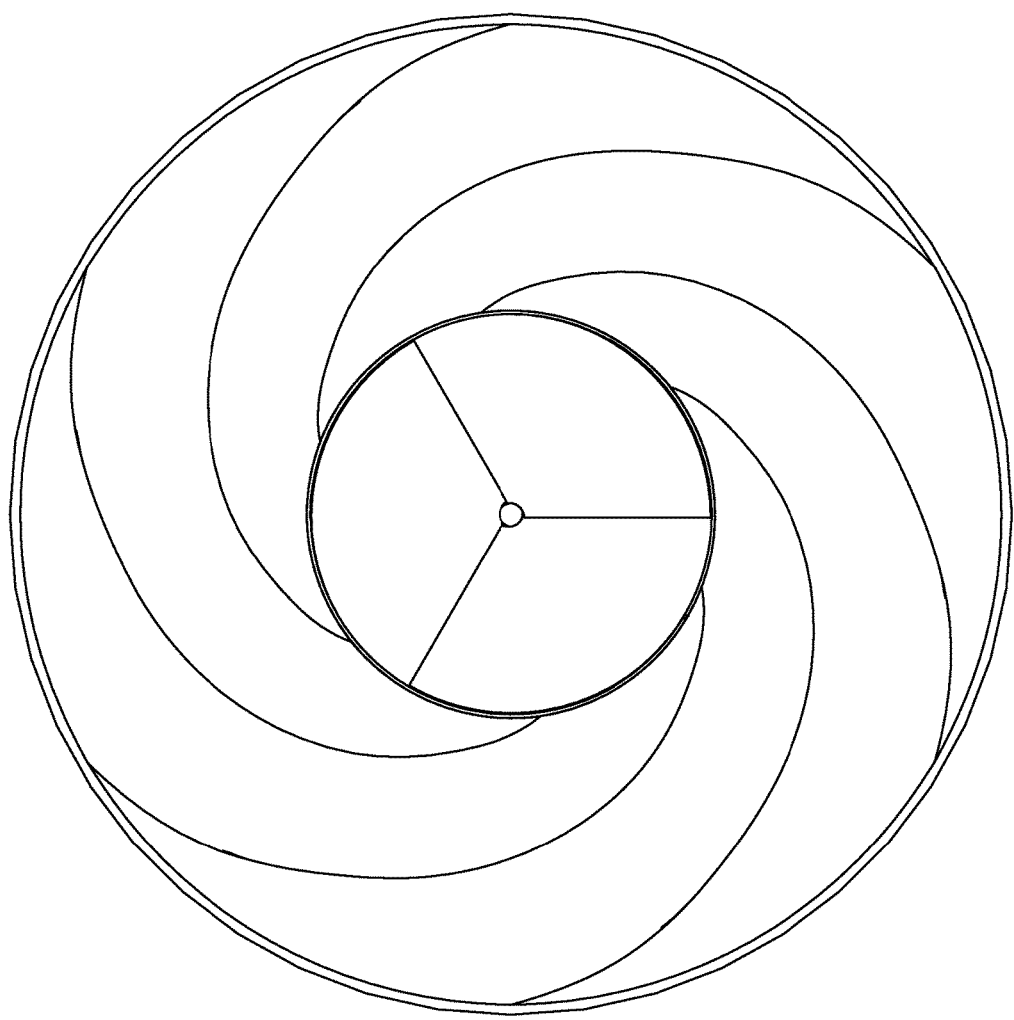
FIG 2B the pivot-plates of the throat-valve in a closed configuration.
Figure 4A:
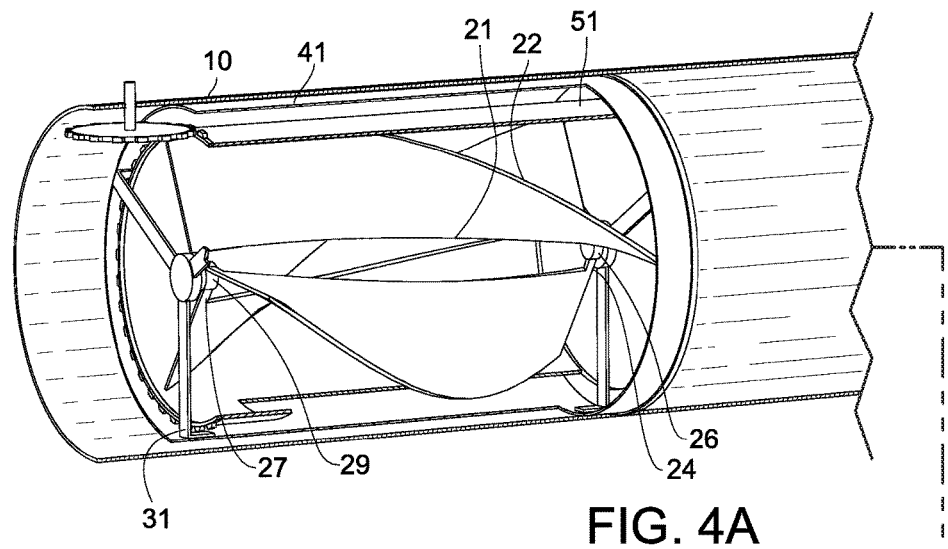
FIG. 4A depicts a partial cutaway perspective view of the turbine end of the invention of FIG. 1; portions of the housing (10), canister (41), sleeve (51) and strut (31) are removed to reveal the interior.
Figure 4B:
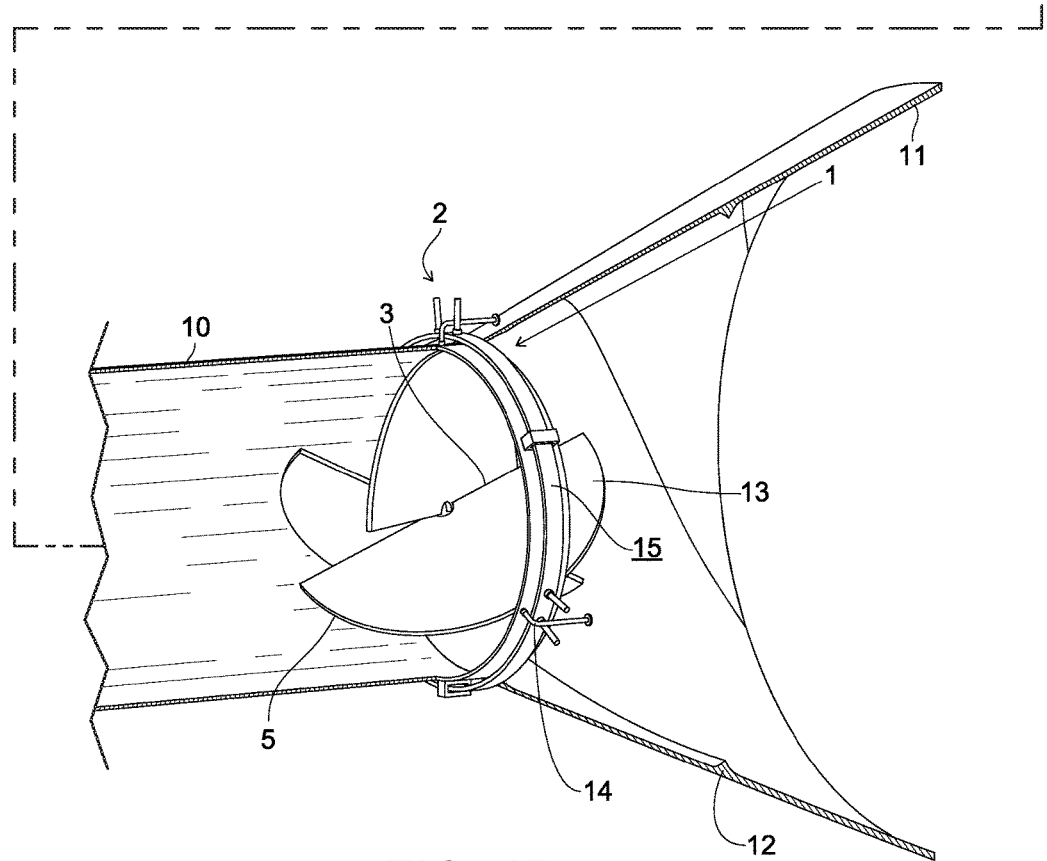
FIG. 4B depicts a partial cutaway perspective view of the funnel end of the invention of FIG. 1, immediately upstream and downstream of the throat (2); portions of the housing (10) and funnel housing (11) have been removed to reveal the pivot-plates (13) of the throat-valve, including a straight edge (3) and a circumferential edge (5); the arrow (1) along with the upper wall of the funnel shows the constriction of that lumen.
Figure 5A:
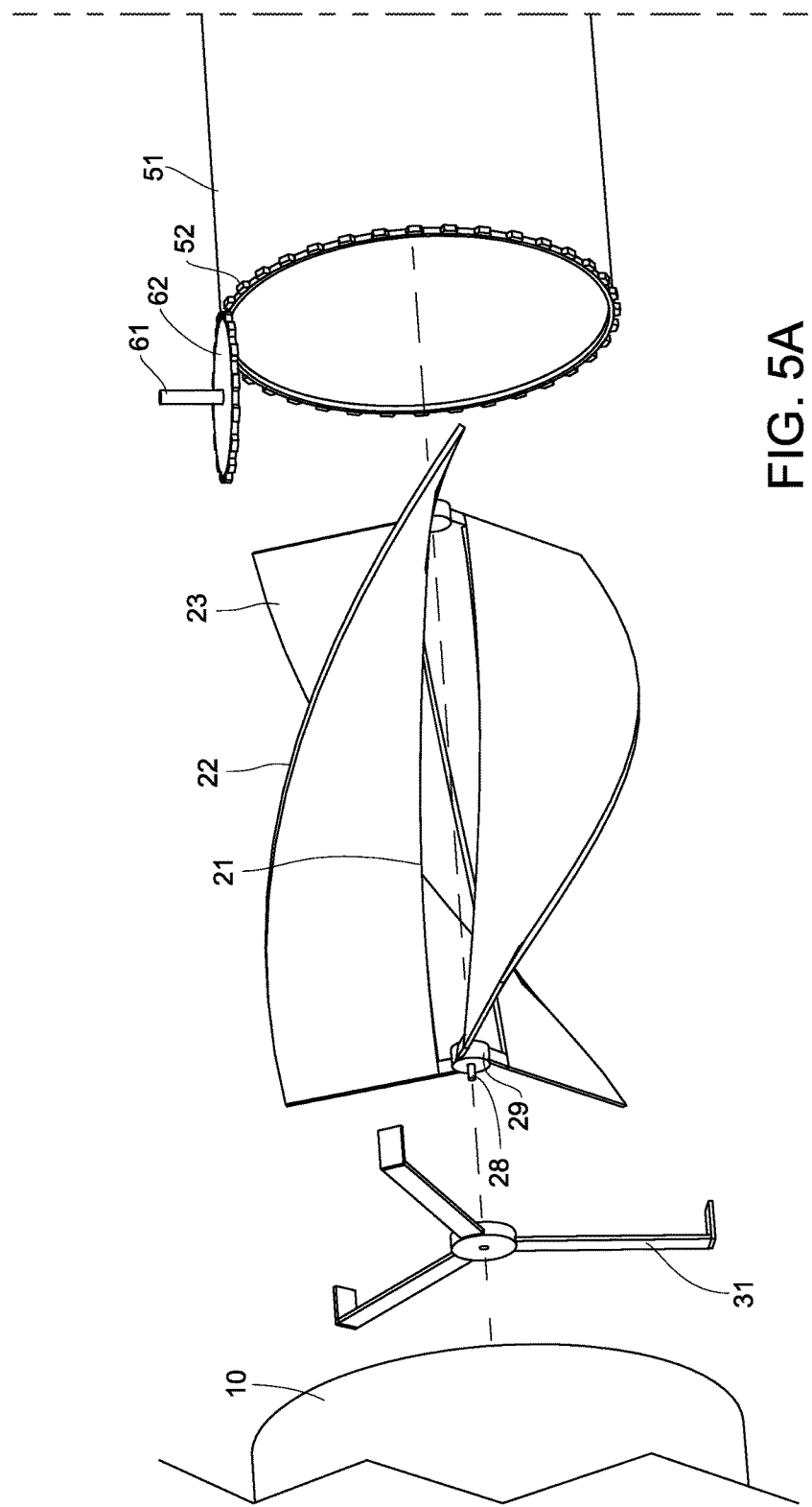
FIGS. 5A and 5B depict an exploded view of the primary structural elements starting, in FIG. 5A, with a portion of the housing (10) downstream of the funnel throat, radial struts (31), a blade assembly including an axle-tip (28), a downstream axle support bearing (29), and blades having an axial edge (21) and a peripheral edge (22) and a vortically curved primary face (23); also depicted in 5A is a downstream end portion of a sleeve (51) with cogged ring (52), together with a gearwheel (62) with a drive shaft (61) or bushing casing for a drive shaft.
Figure 5B:
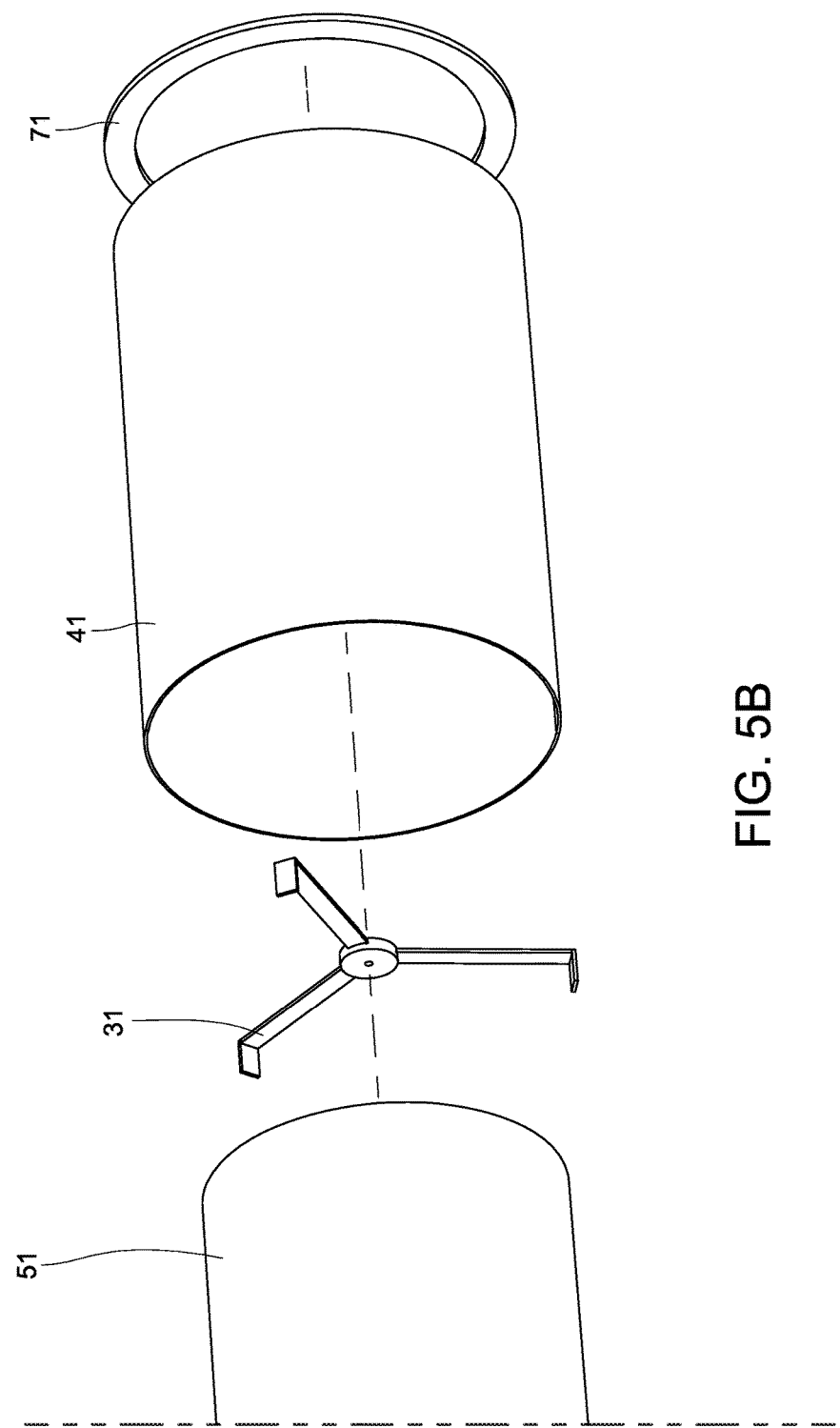
Figure 6:
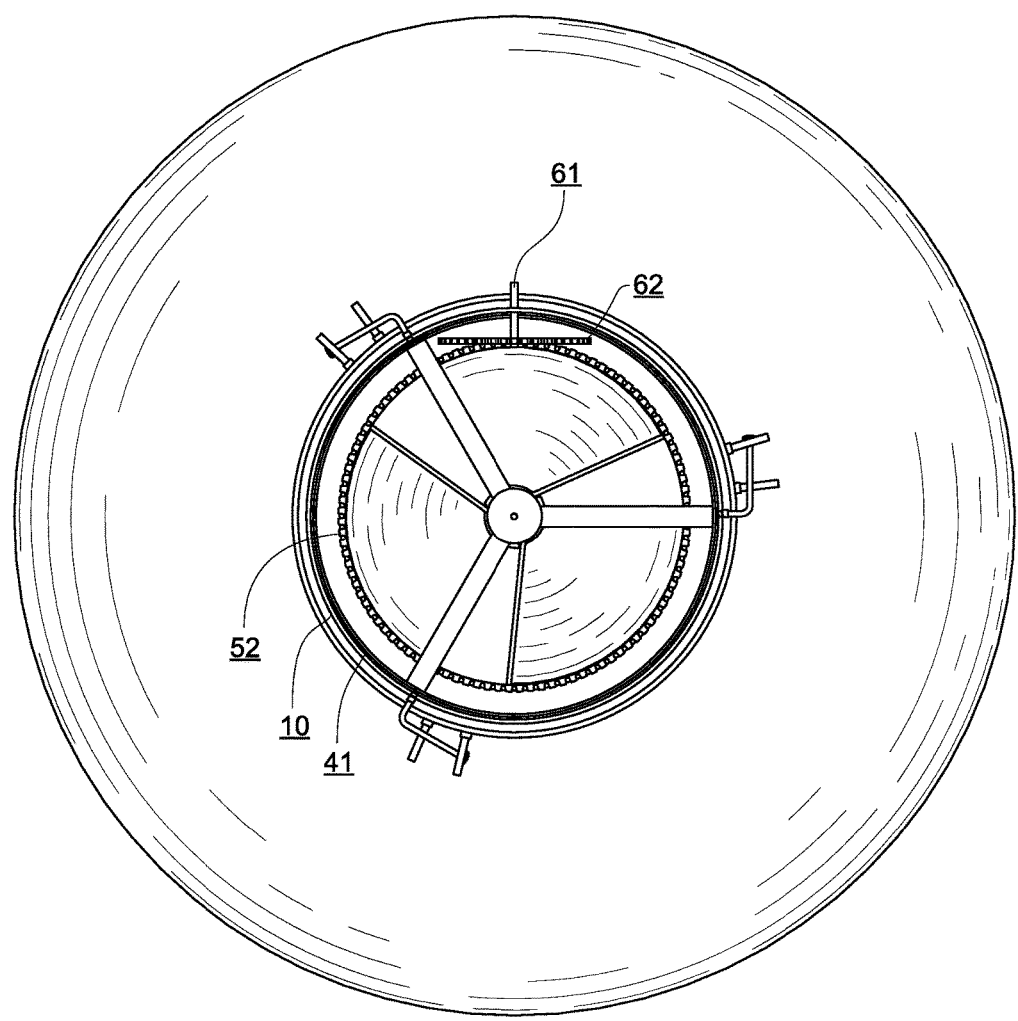
FIG. 6 depicts an elevation view of the downstream end of the invention of FIG. 4.
Figure 7:
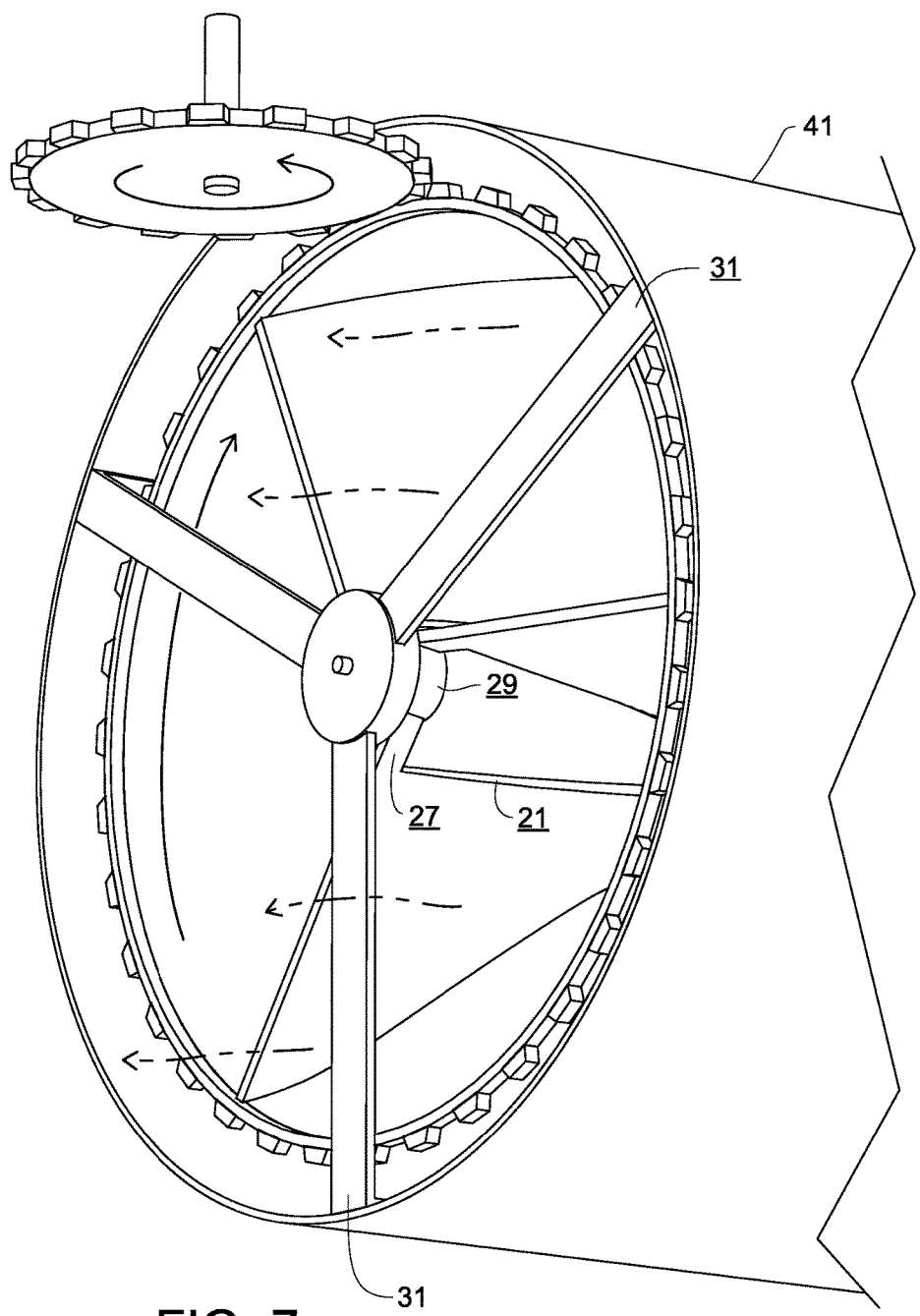
FIG. 7 depicts a close-up perspective view of a portion of the downstream end of a blade assembly within a sleeve telescopically received within a canister, together with associated radial struts and gearwheel.
Figure 8:
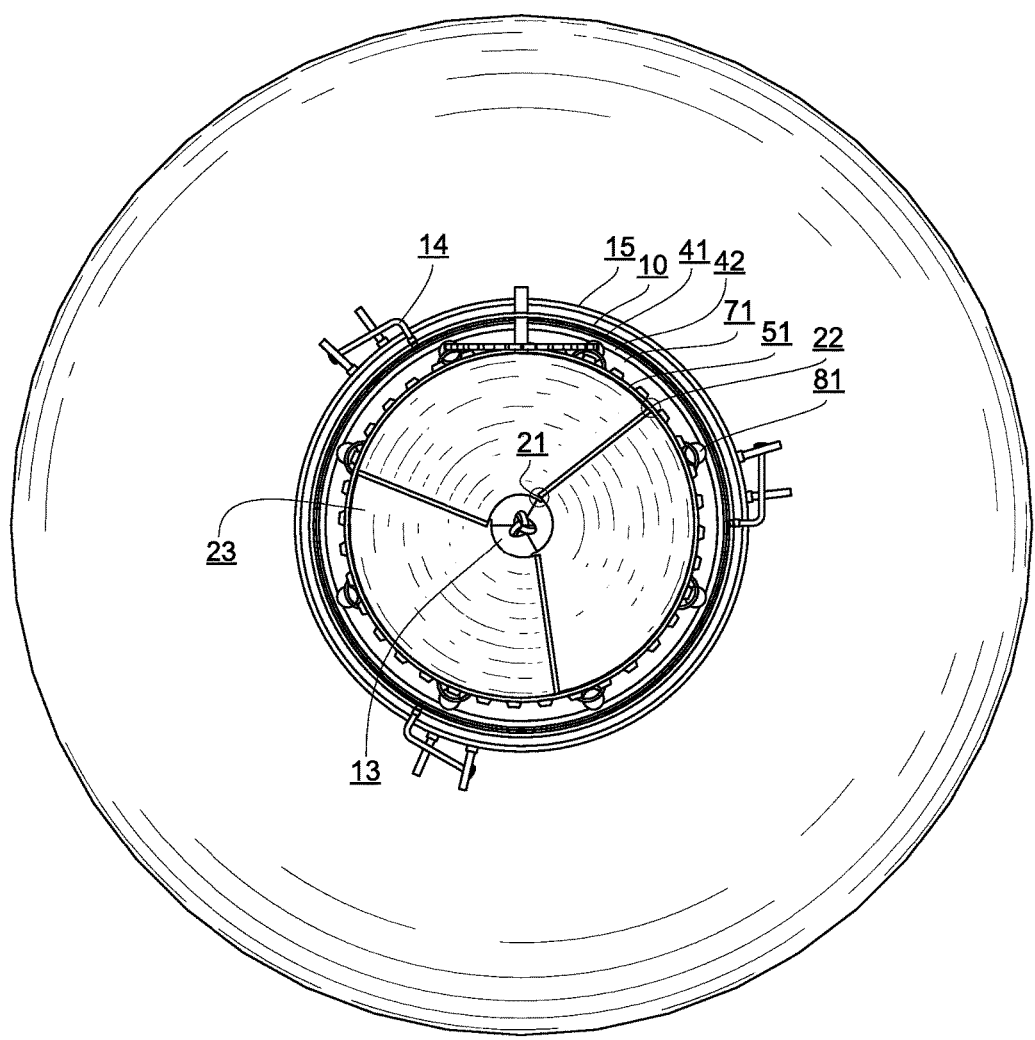
FIG. 8 depicts an elevation view of the downstream end of the invention of FIG. 9, an embodiment having no axle supporting the blades; it shows a portion of the throat-valve visible through the interior passageway formed by the inner axial edges of the blades.
Figure 9A:
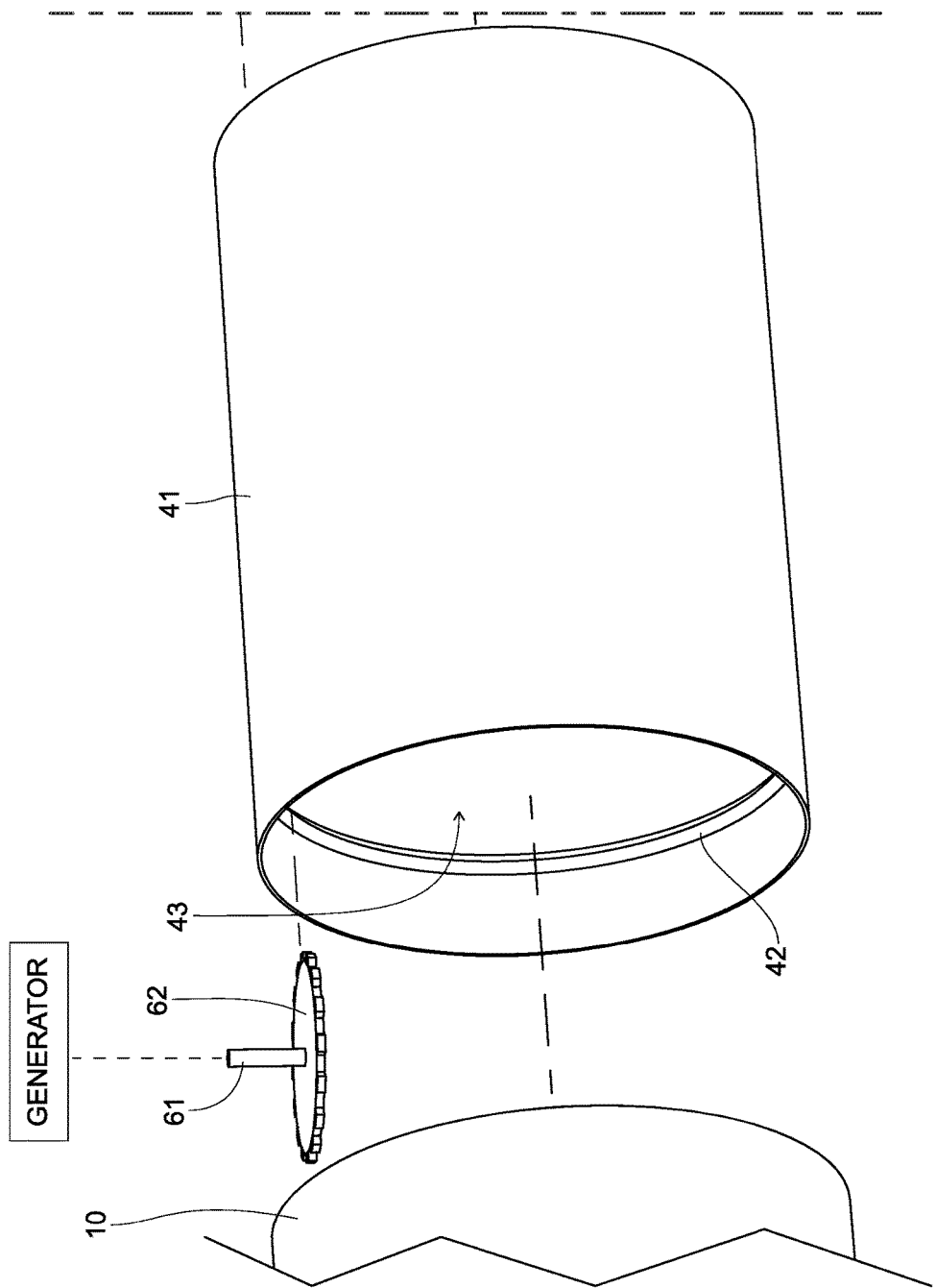
FIGS. 9A and 9B depict an exploded view of the primary structural elements of the turbine portion (50) of the system, primarily comprising the blades affixed within the sleeve (51) with the cogged ring (52), starting, in FIG. 9A, with a portion of the housing (10) downstream of the funnel throat), a gearwheel (62) with a drive shaft (61), and a canister (41) having a lumen (43) and including a rail-ring (42).
Figure 9B:
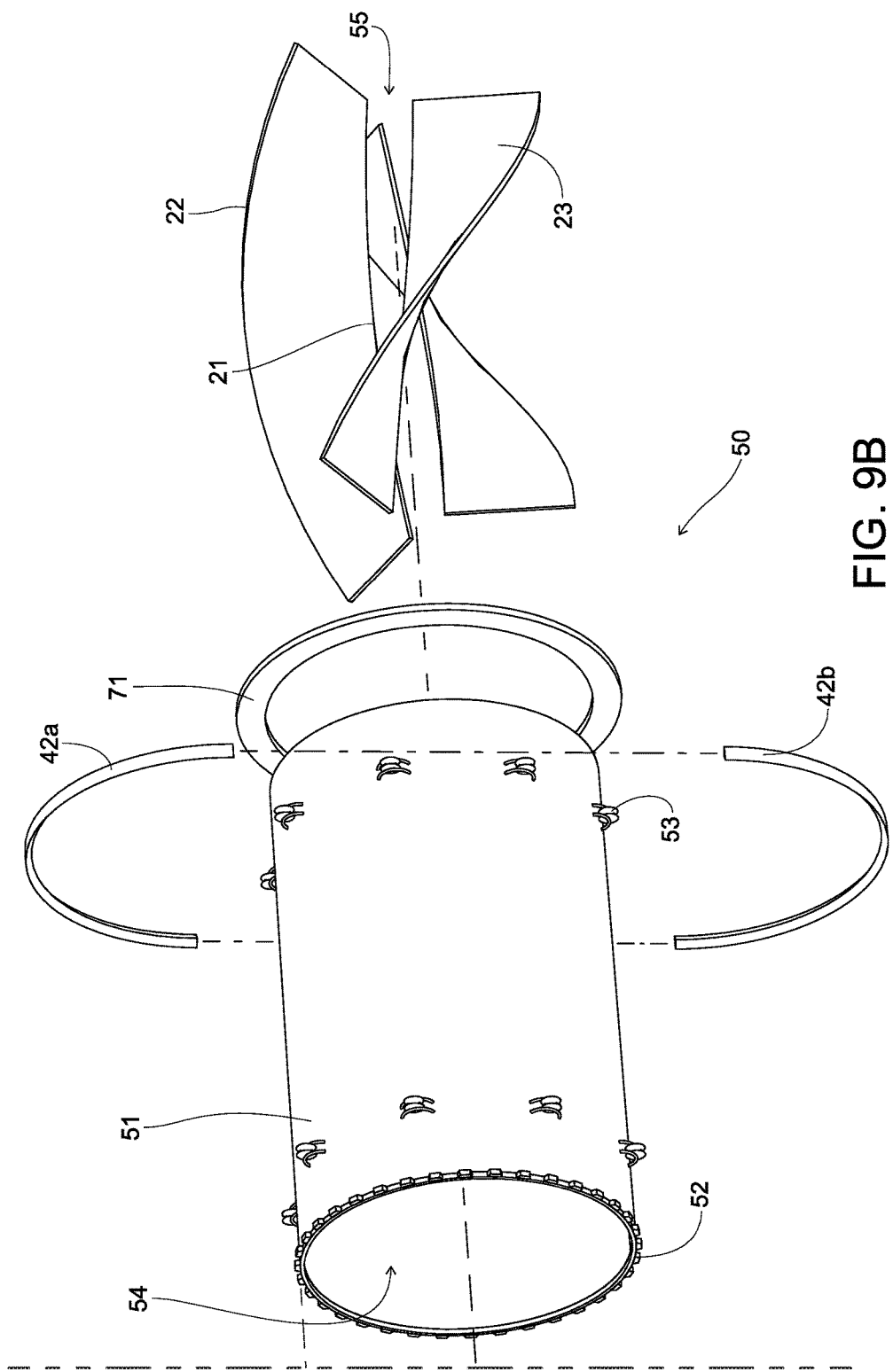
Figure 10:
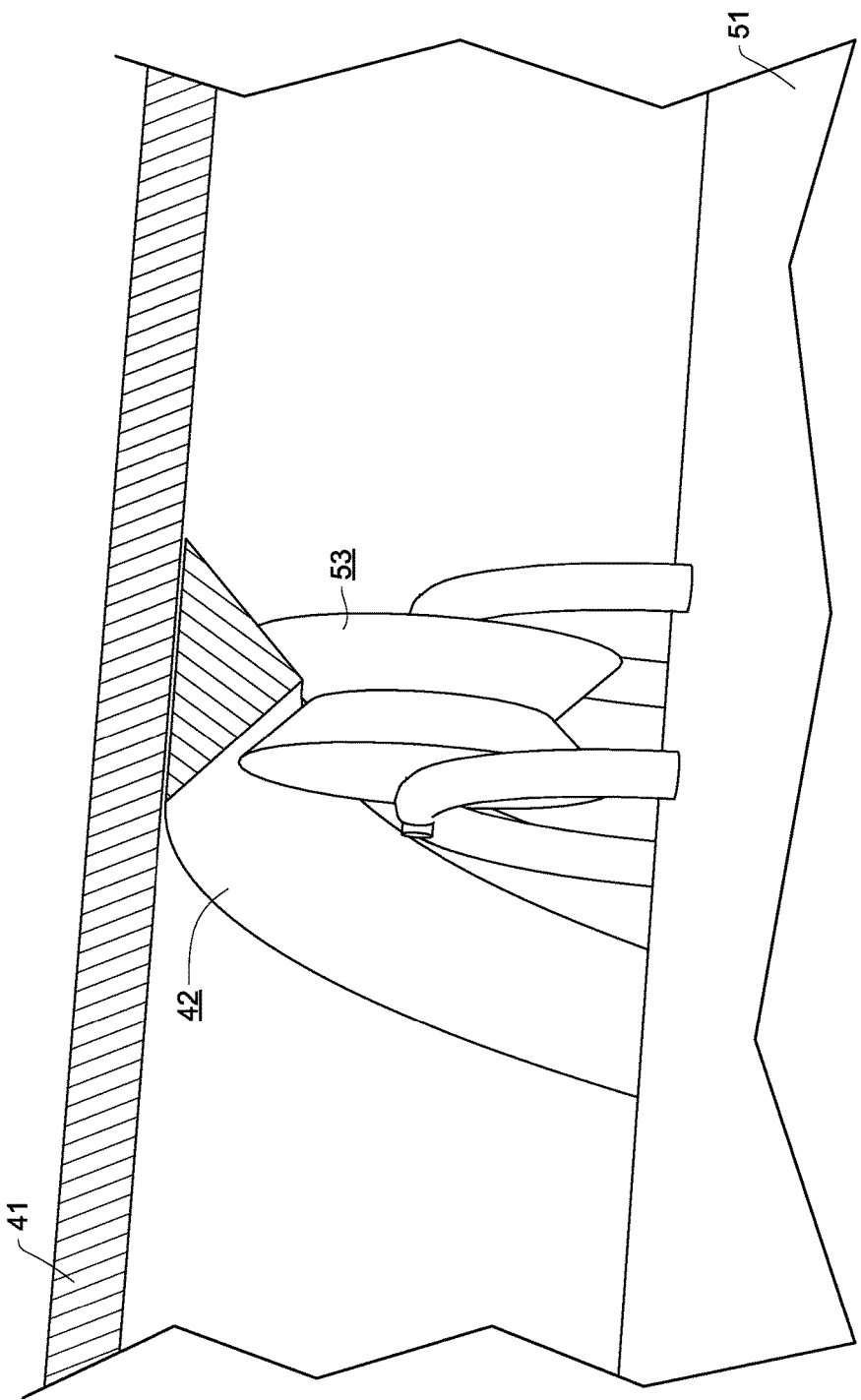
FIG. 10 is a cutaway depicting the interface of a rail-ring (42) and a rail-riding wheel (53).

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

For the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

It will be understood that, although the terms first, second, third, etc. may be used herein to describe various elements, these elements should not be limited by these terms. These terms are only used to distinguish one element from another element.

The disclosure herein is not limited by construction material(s) to the extent that such materials satisfy the structural and/or functional requirements. For example, any material may be used so long as it satisfies the rigid and/or durable structural and functional requirements for which it is being used.

It is an object of the present invention to provide a turbine apparatus for a hydro-electric generator system maximizing the power of current flow and fluid dynamics to optimize the force applied to turbine blades.

Another object of the invention is to provide a turbine apparatus for a hydro-electric generator system that can be deployed without a dam.

Another object of the invention is to provide a turbine apparatus for a hydro-electric generator system using a single current flow to rotate the blades of a plurality of turbines.

Other objects of the invention will become clear upon a review of the disclosure herein.

In general, the invention disclosed herein comprises (includes) a hydro-electric generator system comprising an upstream funnel housing defining a constricting horizontal lumen (1) defined by the inner wall of the funnel, initiating vortical movement of water into a throat and throat-valve which, when in an open configuration, enhances the vortical movement of water through a second constricting lumen within the housing, directing water vortex to a plurality of blades of a turbine for rotational force. The funnel (11) may have an inner surface including a vortical ridge, flange or land (12) upstream of the throat-valve. For embodiments in which the turbine blades rotate around an axle, the funnel opening may include screening preventing entry of sizable debris and/or waterlife into the system.

The throat-valve preferably includes a plurality of pivot-plates (13), and includes a coordination means for coordinating the opening and closing of the pivot-plates.

Each of the pivot-plates may have an essentially half-disc configuration including a straight-edge and a circumferential edge which, when in a closed configuration, mimics the nearby contour of the lumen wall of the funnel throat. Each plate pivots on a pivot-pin (14) extending from the circumferential edge through the housing. In one preferred embodiment, the plurality of pivot-plates form a triad of essentially half-disc pivot-plates; each plate may have a notch near the mid-point of its straight-edge for pivoting coordination with the corresponding nearby notches of the other pivot-plates of the throat-valve, the notch of each pivot-plate being maintained in coordinating proximity to the notch of the second and third other pivot-plates. In overlapping fashion, a portion of the first mentioned pivot-plate may be situated upstream of a portion of the second other pivot-plate while the remaining portion of the first mentioned pivot-plate is situated downstream of a corresponding portion of the third other pivot-plate.

The coordination means may be any means for coordinating the opening and closing of the pivot plates, such as electronically controlled activation of solenoids (not shown) or similar known bi-directional control mechanisms. Another control means includes an outer collar (15) encircling the funnel throat; each of the pivot-plate pivot-pins may have an exterior end yoked to the collar, the rotation of the collar around the funnel throat causing coordinated pivoting of all pivot-plates for opening or closing the throat-valve.

Each of the blades may include a peripheral edge (22), an axial edge (21), and an essentially vortically curved primary face (23) between the edges, the entire upstream-to-downstream length of which receives force from the movement of the water vortex through the housing lumen. This causes the blades to rotate along an axis essentially central through the housing lumen. In one embodiment of the invention, each of the blades may have an upstream axial corner region (24) anchored to an axle-tip (25) carried by an upstream axial support bearing (26) shared by all of the blades. Each of the blades may also have a downstream axial corner region (27) anchored to an axle-tip (28) carried by a downstream axial support bearing (29) shared by all of the blades. In one embodiment, there is a 120 degree difference between the attachment of the upstream end or edge and the attachment of the downstream end or edge; in other words, the blade's curvature is accomplished from its upstream edge to its downstream edge, with a twist of about ⅓ of the 360 degree circumference of the axis. Each of the axial bearings may be mounted at the convergence of a plurality of radial struts (31) anchored within the housing. Accordingly, the blades will rotate around an axle, but with the center portion of the axle removed so that the rotation is around a pair of axle-tips.

In another embodiment, each of the axial bearings may be mounted at the convergence of a plurality of radial struts anchored within a canister (41) telescopically received within the housing (10). The peripheral edges of the blades may also be anchored to the interior wall of the canister. Alternatively, the peripheral edges of the blades may be anchored to the interior wall of a sleeve (51) telescopically received within the canister.

The system involves translating rotation of the turbine blades into rotation within an electricity generator. Several mechanisms will achieve that. The invention disclosed herein may further include a cogged ring (52) encircling the canister or the sleeve, whichever is rotary. The system may further include a gearwheel (62) having teeth meshing with the cogs, the gearwheel rotating a drive shaft (61) extending through the housing and rotating an electric generator. Ideally the drive shaft will be protected and/or journaled by a cylindrical casing or bushing. In this manner, rotation of the turbine blades around an axis that is essentially horizontal (whether a true axle, or axle-tips disclosed herein, or the axle-less version disclosed herein) can be translated into rotation of a drive shaft in a different plane. Other mechanisms for translating rotary motion from one plane to another includes perpendicular axis gears such as Zerol gearing, spiral bevel gearing, worm gearing and other forms of perpendicular rotational transfer gearing (not shown).

Constriction of the lumen is important for increasing the force of the water current within the housing, since forcing a steady stream of water through a smaller opening increases its velocity and therefore force. The second constricting lumen may further include an annular convergence collar shunting water axially away from any space between the canister and the sleeve.

On preferred embodiment of the hydro-electric generator system includes a turbine comprising a plurality of turbines aligned sequentially within the housing.

One axle-less embodiment of the hydro-electric generator system includes a turbine comprising a sleeve telescopically received within the housing lumen, which may have an inner surface supporting a plurality of blades; each blade may have a peripheral edge anchored to the sleeve, an axial edge a short distance from the lumen axis, and an essentially vortically curved primary face between the edges. The entire upstream-to-downstream length of each blade receives force from the movement of the water vortex through the lumen, causing the blades to rotate along an axis essentially central through the lumen but without obstructing the lumen axis.

Also included is an axle-less means governing sleeve rotation around the lumen axis. In one embodiment, the means governing sleeve rotation comprises a canister telescopically received within the housing, and includes a rail-ring encircling the canister lumen; the sleeve is telescopically received within the canister, and includes at least three rail-riding wheels mounted around the circumference in cooperating alignment with the rail-ring. In one embodiment, each wheel is impaled on an axle-let supported by archways or similar support anchored to the circumference of the sleeve. The archways may be flexible in one direction, to allow sufficient movement for installing the axled wheel while maintaining sufficient support for the wheel.

The system may further include a cogged ring encircling the sleeve, together with a gearwheel having teeth meshing with the cogs. The gearwheel rotates a drive shaft extending through the housing, which rotates an electric generator.

As with the axled embodiment of the invention, the axle-less embodiment may include a plurality of canisters/sleeves aligned sequentially in the housing.

Although the vortical motion of the water moving through the primary embodiment is counterclockwise (looking from the upstream end toward the downstream end), the configuration of the elements of the invention may be arranged to impart and enhance clockwise vortical motion.

Ideally the further constricting lumen prevents the flow of water current through any space between the housing and the turbine blades (or the cassette carrying the blades). Ideally all of the water current is focused toward the axial portion of the lumen, to increase the force of the water current upon the blades.

Although the blades may be of whatever construction that will rotate when water current moves downstream over the length of the blades, the primary embodiments disclosed herein have blades that curve 120 degrees from the upstream edge until the downstream edge.

When the turbine blades are connected to an axle, it may be necessary or desirable that the upstream funnel opening include a means of preventing the entry of debris, fish and other sizable life forms.

Although there may be different ways to construct the system, in general it is preferred to construct modules containing a rotary turbine blade assembly, with the module snugly fitting telescopically into the downstream opening of the housing. This will facilitate maintenance and repair of the turbines, and possibly facilitate the use of multiple turbines within one funnel housing system. Ideally, the drive shaft (and/or its cylindrical bushing sleeve) of the gearwheel is threaded through an aperture in the downstream end of the housing, after the turbine blade assembly is in place, so that the gearwheel can interact with the cogs of the cogged ring of the turbine blade assembly.

The funnel opening may be detachable from the throat-valve portion of the funnel housing, or integral therewith. Again, a detachable funnel portion will facilitate maintenance and repair of the throat-valve.

In use, the system may be submersed and anchored in a waterway, ideally where current is sufficiently steady and strong to assure adequate force to rotate the turbine blades so that a generator drive shaft can turn. The system should be orientated so that the funnel end is upstream, and the body of the housing is essentially parallel to the current flow. If the throat-valve is closed, it should be opened to allow the current flow to enter and initiate the vortical movement of the water. In the prototype depicted in the drawings, each of the pivot pins extends out of the funnel housing near the throat-valve, and is bent approximately perpendicularly; the free end extends through a pair of stops upstanding from an outer control collar surrounding the funnel housing. The tip of the free end of the pivot pin may also include a structure preventing the pivot pin from moving outside of the pair of stops. When the outer collar is rotated around the housing, the pairs of stops (capturing the pivot pins) are rotated as well, so that all the pivot pins are actuated simultaneously to open or close the throat-valve.

I claim:

1. A hydro-electric generator system to generate electricity from a water current, the system comprising:
   a housing including an upstream funnel portion and a constricting horizontal lumen, the upstream funnel portion orientable in a same direction as the water current and focusing the water current into the constricting horizontal lumen, the lumen having a longitudinal lumen axis generally aligned in the same direction as the water current;
   a throat including a throat-valve;
   at least one turbine, the turbine having a plurality of blades rotatable around the lumen axis;
   the throat-valve including a plurality of pivot plates and a coordination means for coordinating an opening and closing of the pivot plates;
   each pivot plate comprising a half-disc configuration including a straight edge and a circumferential edge, such that the circumferential edge has a curvature which closely follows a curvature of an interior wall of the lumen;
   each pivot plate pivoting on a pivot pin extending from the circumferential edge of the pivot plate through a wall of the funnel, each pivot pin connecting a respective pivot plate to the coordination means;

wherein the funnel initiates a vortical movement of water into the throat-valve, and the throat-valve, when in an open configuration, defined by the opening of the pivot plates, enhances the vortical movement of water to the blades for generating rotational force;

the turbine further comprising a sleeve telescopically received within the housing lumen, the sleeve having an inner surface connected to and supporting the plurality of blades, each blade extending longitudinally in a same direction as the lumen axis, each blade having
- an outer peripheral edge anchored to the sleeve,
- an inner axial edge separated by a short distance from the lumen axis such that an interior passageway is formed about the lumen axis by the inner axial edges of the plurality of blades, and
- a vortically curved primary face between the peripheral edge and the axial edge, such that an entire upstream-to-downstream length of the primary face receives force from the vortical movement of the water current flowing through the lumen, thereby causing the blades, and the sleeve connected thereto, to rotate about the lumen axis;

the sleeve further comprising a cogged ring encircling a periphery of the sleeve at one end thereof, and the system further comprising a gearwheel having teeth meshing with the cogged ring, the gearwheel rotating a drive shaft extending through the housing and operably connected to an electric generator;

wherein rotation of the blades by the water current causes the sleeve to rotate, thereby causing rotation of the electric generator via the gearwheel to thereby generate the electricity.

2. A hydro-electric generator system as described in claim 1, the funnel comprising an inner surface including a vortical ridge upstream of the throat-valve, the vortical ridge enhancing said vortical movement of water.

3. A hydro-electric generator system as described in claim 1, the plurality of pivot plates comprising three pivot plates, each plate having a notch near a mid-point of the straight edge for pivoting coordination with corresponding nearby notches of the other pivot plates of the throat-valve, the notch of each pivot-plate maintained in coordinating proximity to the notches of the other pivot-plates, the pivoting coordination of the pivot plates allowing for each pivot plate to diagonally overlap an adjacent pivot plate.

4. A hydro-electric generator system as described in claim 1, the coordination means comprising an outer collar encircling the throat, each of the pivot plate pivot pins comprising an exterior end yoked to the collar, such that rotation of the collar around the throat causes coordinated pivoting of all the pivot plates for opening or closing the throat-valve.

5. A hydro-electric generator system as described in claim 1, wherein the sleeve is telescopically received within a canister.

6. A hydro-electric generator system as described in claim 5, further comprising an annular convergence collar shunting water axially away from any space between the canister and the sleeve.

7. A hydro-electric generator system as described in claim 5, the system further comprising an axle-less means for governing sleeve rotation around the lumen axis.

8. A hydro-electric generator system as described in claim 7, the means for governing sleeve rotation comprising the canister telescopically received within the housing and further including a rail-ring encircling an interior periphery of the canister, the sleeve telescopically received within the canister and including at least three rail-riding wheels mounted around an outer circumference of the sleeve in cooperating alignment with the rail-ring.

9. A hydro-electric generator system as described in claim 8, the rail-ring comprising a plurality of essentially parallel rail-rings encircling the housing lumen in spaced relationship, the sleeve further comprising, for each of the rail-rings, at least three rail-riding wheels mounted around the outer circumference in cooperating alignment with a respective rail-ring.

10. A hydro-electric generator system as described in claim 1, the at least one turbine comprising a plurality of turbines aligned sequentially within the housing, each turbine independently driving a respective drive shaft rotating a respective electric generator.

11. A hydro-electric generator system to generate electricity from a water current, the system comprising:
  (a) a housing including an upstream funnel portion and a constricting horizontal housing lumen, the upstream funnel portion orientable in a same direction as the water current and focusing the water current into the housing lumen, the housing lumen having a longitudinal lumen axis generally aligned in the same direction as the water current;
  (b) a throat including a throat-valve having a plurality of pivot plates and a coordination means for coordinating an opening and closing of the pivot plates, each pivot plate comprising a half-disc configuration including a straight edge and a circumferential edge, such that the circumferential edge has a curvature which closely follows a curvature of an interior wall of the housing lumen, each pivot plate pivoting on a pivot pin extending from the circumferential edge of the pivot plate through a wall of the funnel, each pivot pin connecting a respective pivot plate to the coordination means; wherein the funnel initiates a vortical movement of water into the throat-valve, and the throat-valve, when in an open configuration, defined by the opening of the pivot plates, enhances the vortical movement of water to the blades for generating rotational force; and
  (c) a turbine comprising:
  (1) a canister defining a canister lumen, the canister telescopically received within the housing and including a rail-ring encircling an interior periphery of the canister;
  (2) a sleeve defining a sleeve lumen, the sleeve telescopically received within the canister and including a cogged ring encircling the sleeve and at least three rail-riding wheels mounted around an outer circumference thereof, the wheels in cooperating alignment with the rail-ring, the sleeve having an inner surface supporting a plurality of blades, each blade extending longitudinally in a same direction as the lumen axis, each blade having an outer peripheral edge anchored to the sleeve, an inner axial edge separated by a short distance from the lumen axis such that an interior passageway is formed about the lumen axis by the inner axial edges of the plurality of blades, each blade further including a vortically curved primary face between the peripheral edge and the axial edge, such that an entire upstream-to-downstream length of the primary face receives force from the vortical movement of the water current flowing through the sleeve lumen, thereby causing the blades to rotate about the lumen axis; and (3) a gearwheel having teeth meshing with the cogged ring, the gearwheel rotating a drive shaft extending through the housing and operably connected to an electric generator;

wherein rotation of the blades by the water current causes the sleeve to rotate, thereby causing rotation of the electric generator via the gearwheel to thereby generate the electricity.

\* \* \* \* \*